US005865607A

United States Patent [19]
Fukuoka

[11] Patent Number: 5,865,607
[45] Date of Patent: Feb. 2, 1999

[54] REFRIGERATING CYCLE OR COMPRESSOR HAVING FOREIGN MATTER COLLECTOR

[75] Inventor: Hirotsugu Fukuoka, Kusatsu, Japan

[73] Assignee: Matsushita Electronic Industrial Co. Ltd., Japan

[21] Appl. No.: 802,533

[22] Filed: Feb. 18, 1997

[30] Foreign Application Priority Data

Feb. 16, 1996 [JP] Japan .................................... 8-053908

[51] Int. Cl.$^{6}$ ............................ F04C 29/00; F25B 43/00; B01D 45/12; B03C 1/00

[52] U.S. Cl. ................................ 418/46; 62/475; 55/439; 55/461; 96/1

[58] Field of Search ................................ 418/46; 55/439, 55/447, 461, DIG. 15; 95/28, 269, 272; 96/1; 62/475

[56] References Cited

U.S. PATENT DOCUMENTS 1,635,271 7/1927 Hapgood .................................. 418/46
2,306,216 12/1942 King et al. ................................ 55/439

FOREIGN PATENT DOCUMENTS 345233 12/1921 Germany ................................ 55/461
52-61811 5/1977 Japan ...................................... 418/46
4-203491 7/1992 Japan ...................................... 418/46
373661 6/1932 United Kingdom ..................... 55/461

*Primary Examiner*—John J. Vrablik
*Attorney, Agent, or Firm*—Parkhurst & Wendel

[57] ABSTRACT

The present invention is intended to remove foreign matter such as worn powder in a refrigerating cycle and enhance the reliability in a refrigerating cycle using, in particular, HFC refrigerant. In the invention, accordingly, a coil shaped connection piping is provided in at least front portion or rear portion of a throttling unit, a fine pipe is connected to a lower portion of the connection piping, and a collector for collecting foreign matter in the refrigerating cycle is coupled to this fine pipe. Foreign matter in the refrigerant is separated from the refrigerant by centrifugal force, and is collected in the collector. Moreover, the foreign matter collecting effect is enhanced by disposing a magnetic piece in the collector.

3 Claims, 11 Drawing Sheets

REFRIGERATING CYCLE OR COMPRESSOR HAVING FOREIGN MATTER COLLECTOR

FIELD OF THE INVENTION

The present invention relates to a refrigerating cycle or compressor having a foreign matter collector for collecting foreign matter in a refrigerating cycle, for use in cooling apparatus, refrigerating apparatus, or air-conditioner.

BACKGROUND OF THE INVENTION

A conventional refrigerating cycle is described by referring to FIG. 11. In FIG. 11, reference numeral 101 shows a compressor. The refrigerant compressed in the compressor 101 is condensed in a condenser 102. The refrigerant expanded in a throttling unit 103 is evaporated in an evaporator 104, and cooling is effected by evaporation of latent heat. When operating such a refrigerating cycle, foreign matter mainly composed of iron powder and copper powder mixed at the time of assembly is likely to deposit in the throttling unit 103 where the flow velocity of the refrigerant is slow and the passage area is narrow. Moreover, worn powder from the sliding parts of the compressor and carbides due to deterioration of refrigerating machine oil also deposit in the throttling unit 103. As a result, the sectional area of the throttling unit 103 becomes gradually narrower, the throttling rate becomes larger, and the compression ratio of the high pressure side and low pressure side becomes higher. Accordingly, the temperature of the refrigerant discharged from the compressor is raised, the abrasion of the sliding parts is further promoted, and clogging of the throttling unit 103 with worn powder is increased, thus falling in a spiral. Therefore, the reliability of the refrigerating cycle is spoiled extremely.

As the refrigerant for such refrigerating cycle, hitherto, dichlorofluoromethane (CFC12) or hydrodifluoromethane (HCFC22) has been mainly utilized. As the refrigerating machine oil to be packed in the compressor, naphthene or paraffin mineral oil having compatibility with CFC12 or HCFC22 has been used.

Since these refrigerants and refrigerating machine oils directly circulate within the compressor, the compressor mechanism is required to have wear resistance.

It has been recently disclosed that these refrigerants, when released in the atmosphere, destroy the ozone layer and have serious effects on the human health and ecological system, and therefore the use of CFC12 or HCFC22 is being limited in gradual steps, and there is an international agreement to abolish them completely in the future.

In such circumstance, substitute refrigerants have been developed, such as 1,1,1,2-tetrafluoroethane (HFC134a), pentafluoroethane (HFC125), hydrodifluoromethane (HFC32), and their mixed refrigerants.

These refrigerants HFC134a, HFC125, HFC32 are low in the coefficient of ozone destruction, but are hardly compatible with mineral oils which are refrigerating machine oils employed when using CFC12 or HCFC22. Hence, when using HFC134a, HFC125, HFC32 or their mixed refrigerants as the refrigerant of the refrigerant compressor, it has been attempted to use ester, ether or fluorine oil, compatible with these refrigerants as the refrigerating machine oil.

As the refrigerating machine oil compatible with HFC134a, HFC125, HFC32 replacing the refrigerants CFC12 and HCFC22, polyalkylene glycol oil and polyester oil are known. In the case of the refrigerant compressor using such polyalkylene glycol oil and polyester oil, however, gray cast iron, special cast iron, and stainless steel used as the sliding materials in the compressor are lowered in wear resistance, and the refrigerant compressor cannot be operated stably for a long period.

This is because the chlorine atom, one of the elements composing the conventional refrigerant such as CFC12 and HCFC22, reacts with the iron atom in the metal material and forms a wear resistant iron chloride film. By contrast, when using HFC134a, HFC125, or HFC32 as refrigerant, since the chorine atom is not present in these refrigerants, lubricating film such as iron chloride film is not formed, which is one of the causes of lowering of lubricating action.

Moreover, in the conventional refrigerating machine oil derived from mineral oil, cyclic compounds were contained, and the oil film forming capability was relatively high, but the refrigerating machine oil compatible with HFC134a, HFC125, or HFC32 is mainly composed of chain compounds, and an appropriate oil film thickness cannot be maintained in severe sliding conditions, which also causes to lower the wear resistance.

Thus, in the refrigerant compressor using substitute refrigerant such as HFC134a, HFC125 or HFC32 instead of CFC12 or HCFC22, and employing refrigerating machine oil compatible with these refrigerants, the sliding condition is severe not only at high load but also at ordinary load, and abrasion of sliding members is increased. It was hence a more difficult problem than in the prior art to prevent clogging of the throttling unit in the refrigerating cycle.

Among refrigerating machine oils compatible with HFC refrigerant, polyester derivative refrigerating machine oil undergoes decomposition of polyester due to hydrolysis or pyrolysis, and is bound with worn powder to produce iron soap. The iron soap is high in viscosity, deposits in the throttling unit in the refrigerating cycle, raises the discharge refrigerant temperature in the compressor, and further promotes wear, and the reliability of the refrigerating cycle is lowered by this spiral.

Still more, the refrigerating machine oil compatible with the HFC refrigerant is not compatible with the conventional mineral oil and is not used, but the conventional mineral oil is used as machining oil when fabricating the compressor and heat exchanger. This mineral oil remaining in the refrigerating cycle is likely to deposit in the throttling unit which is slow in flow velocity and drastic in temperature changes. As a result, it leads to decline of reliability due to clogging of the throttling unit same as mentioned above.

DISCLOSURE OF THE INVENTION

The invention is devised to solve the above problems, and it is hence an object thereof to present a refrigerating cycle and a compressor enhanced in reliability and extended in service life by collecting foreign matter in the refrigerating cycle, in particular, when using HFC refrigerant.

In an embodiment of the invention, a connection piping in a coil shape is provided in at least front part or rear part of a throttling unit, a fine pipe is connected to a lower part of the connection piping, and a collector for collecting foreign matter in a refrigerating cycle is coupled to a leading end of the fine pipe.

In another embodiment of the invention, a fine pipe is connected to a connection piping provided in at least front part or rear part of a throttling unit, a center line of the fine pipe is inclined at 90° or less in a flowing direction of refrigerant, and a collector is coupled to a leading end of the fine pipe.

In another embodiment of the invention, a rotary plate twisted in a spiral direction is provided in a piping for composing a refrigerating cycle, a fine pipe is connected to the piping at a downstream side of this rotary plate, and a collector is attached to a leading end of the fine pipe.

In another embodiment of the invention, relating to a compressor having a compressing mechanism incorporated in an enclosed container, a recess having an action of collecting foreign matter is provided at an inside of a lowest portion of the enclosed container. In In an embodiment of the invention, relating to a compressor having a compressing mechanism incorporated in an enclosed container, a muffler is provided at a discharge part of compressed refrigerant, and a communication path curved in a circumferential direction is provided in a discharge hole of the muffler, a fine pipe is connected to an outside of the communication path, and a collector is coupled to a leading end of the fine pipe.

In another embodiment of the invention, a fine pipe inclined at 90° or less in a flowing direction of refrigerant is connected to a discharge pipe for discharging compressed refrigerant, and a collector is coupled to the fine pipe.

In another embodiment of the invention, a fine pipe inclined at 90° or less in a flowing direction of refrigerant is connected to a discharge pipe for discharging compressed refrigerant, the fine pipe is connected to an inlet of a collector, a filter is provided in the collector, a bypass pipe is coupled to the other outlet of the collector, and a leading end of the bypass pipe is coupled with the discharge pipe.

In another embodiment of the invention, a compressing mechanism includes a rotary shaft for transmitting rotation, and an upper bearing and a lower bearing for supporting the rotary shaft, an oil feed path for lubrication is provided in the upper bearing and the lower bearing, and a collector inclined at an angle of 90° or less in a flowing direction of lubricating oil and closed at a leading end is provided in the oil feed paths.

In another embodiment of the invention, relating to a compressor used in refrigerating or air-conditioning system, using chlorine-free hydrofluorocarbon used as refrigerant either alone or in mixture, and packing an enclosed container with refrigerating machine oil compatible with the refrigerant, a motor and a compressing mechanism are disposed in the enclosed container, the compressing mechanism includes a rotary shaft for transmitting rotation of the motor, an oil feed pump is provided in the rotary shaft, a communication hole for feeding refrigerating machine oil to necessary parts is formed, a passage extending downward to the communication hole is provided, and the other end of the passage is closed.

In another embodiment of the invention, relating to a compressor used in refrigerating or air-conditioning system, using chlorine-free hydrofluorocarbon used as refrigerant either alone or in mixture, and packing an enclosed container with refrigerating machine oil compatible with the refrigerant, a motor and a compressing mechanism are disposed in the enclosed container, the motor includes a stator and a rotor, the rotor has a rotary shaft for transmitting rotation to the compressing mechanism, the rotary shaft has an oil feed pump, an oil feed path for feeding the refrigerating machine oil to sliding parts is further formed in the rotary shaft, the oil feed path and one end of a fine pipe are connected with each other, and a leading end of the fine pipe and a collector provided in the rotor are connected with each other.

Many of the means for solving the problems mentioned above are suited to the refrigerating cycle or compressor using, in particular, hydrofluorocarbon as refrigerant, and using refrigerating machine oil compatible with this refrigerant.

DESCRIPTION OF THE PREFERRED EMBODIMENTS

Figure 1:
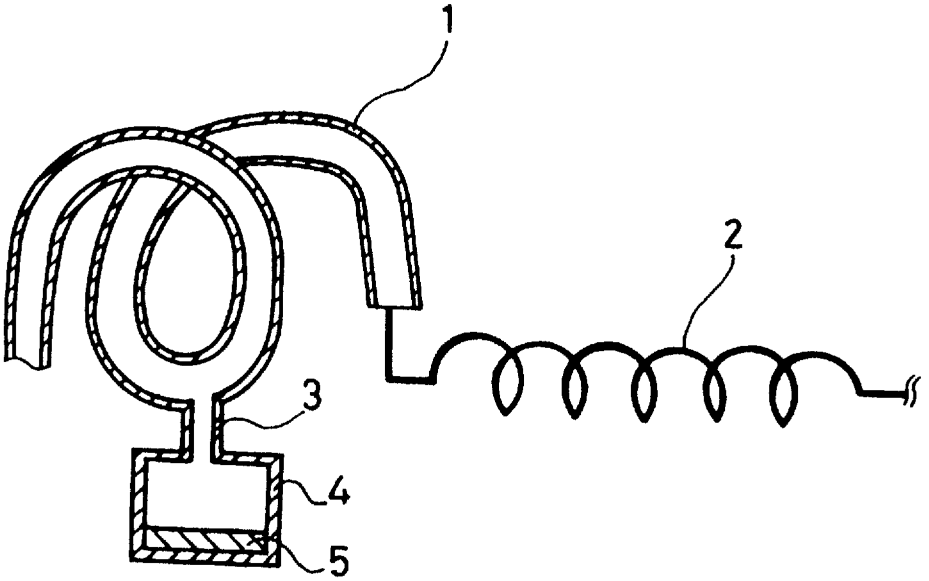
FIG. 1 is an essential longitudinal sectional view of a refrigerating cycle in embodiment 1 of the invention.

According to a preferred embodiment of the invention, a connection piping in a coil shape is provided in at least front part or rear part of a throttling unit, a fine pipe is connected to a lower part of the connection piping, and a collector for collecting foreign matter in a refrigerating cycle is coupled to a leading end of the fine pipe, whereby foreign matter such as worn powder is collected in the collector through the fine pipe by centrifugal force.

According to another embodiment of the invention, a fine pipe is connected to a connection piping provided in at least front part or rear part of a throttling unit, a center line of the fine pipe is inclined at 90° or less in a flowing direction of refrigerant, and a collector is coupled to a leading end of the fine pipe, whereby foreign matter such as worn powder is collected in the collector through the fine pipe by flow velocity of the refrigerant.

According to another embodiment of the invention, a rotary plate twisted in a spiral direction is provided in a piping for composing a refrigerating cycle, a fine pipe is connected to the piping at a downstream side of this rotary plate, and a collector is attached to a leading end of the fine pipe. In this constitution, from refrigerant provided with a flow in a rotating direction, foreign matter such as worn powder is separated by centrifugal force, and is collected in the collector through the fine pipe.

According to another embodiment of the invention, relating to a compressor having a compressing mechanism incorporated in an enclosed container, a recess having an action of collecting foreign matter is provided at an inside of a lowest portion of the enclosed container, whereby foreign matter such as worn powder in the enclosed container is greater in specific gravity and is collected in the recess.

According to another embodiment of the invention, relating to a compressor having a compressing mechanism incorporated in an enclosed container, a muffler is provided at a discharge part of compressed refrigerant, and a communication path curved in a circumferential direction is provided in a discharge hole of the muffler, a fine pipe is connected to an outside of the communication path, and a collector is coupled to a leading end of the fine pipe, whereby foreign matter in the discharge refrigerant is separated by centrifugal force, and is collected in the collector through the fine pipe.

According to another embodiment of the invention, relating to a compressor having a compressing mechanism incorporated in an enclosed container, a fine pipe inclined at 90° or less in a flowing direction of refrigerant is connected to a discharge pipe for discharging compressed refrigerant, and a collector is coupled to the fine pipe, whereby foreign matter is separated from the refrigerant by a flow of the refrigerant, and is collected in the collector of foreign matter.

According to another embodiment of the invention, relating to a compressor having a compressing mechanism incorporated in an enclosed container, a fine pipe inclined at 90° or less in a flowing direction of refrigerant is connected to a discharge pipe for discharging compressed refrigerant, the fine pipe is connected to an inlet of a collector, a filter is provided in the collector, a bypass pipe is coupled to the other outlet of the collector, and a leading end of the bypass pipe is coupled with the discharge pipe, whereby foreign matter in the refrigerant is collected by the filter.

According to another embodiment of the invention, relating to a compressor having a compressing mechanism incorporated in an enclosed container, the compressing mechanism includes a rotary shaft for transmitting rotation, and an upper bearing and a lower bearing for supporting the rotary shaft, an oil feed path for lubrication is provided in the upper bearing and the lower bearing, and a collector inclined at an angle of 90° or less in a flowing direction of lubricating oil and closed at a leading end is provided in the oil feed paths, whereby foreign matter such as worn powder in the refrigerating machine oil is separated by difference in specific gravity, and is collected in the collector.

According to another embodiment of the invention, relating to a compressor used in refrigerating or air-conditioning system, using chlorine-free hydrofluorocarbon used as refrigerant either alone or in mixture, and packing an enclosed container with refrigerating machine oil compatible with the refrigerant, a motor and a compressing mechanism are disposed in the enclosed container, the compressing mechanism includes a rotary shaft for transmitting rotation of the motor, an oil feed pump is provided in the rotary shaft, a communication hole for feeding the refrigerating machine oil to necessary parts is formed, a passage extending downward to the communication hole is provided, and the other end of the passage is closed, whereby foreign matter such as worn powder in the refrigerating machine oil is separated by difference in specific gravity, and is collected in the passage.

According to another embodiment of the invention, relating to a compress or used in refrigerating o r air-conditioning system, using chlorine-free hydrofluorocarbon used as refrigerant either alone or in mixture, an d packing an enclosed container with refrigerating machine oil compatible with the refrigerant, a motor and a compressing mechanism are disposed in the enclosed container, the motor includes a stator and a rotor, the rotor has a rotary shaft for transmitting rotation to the compressing mechanism, the rotary shaft has an oil feed pump, an oil feed path for feeding the refrigerating machine oil to sliding parts is further formed in the rotary shaft, the oil feed path and one end of a fine pipe are connected with each other, and a leading end of the fine pipe and a collector provided in the rotor are connected with each other, whereby foreign matter such as worn powder in the refrigerating machine oil is separated by difference in specific gravity, and is collected in the collector.

The claimed invention further enhances the collection of foreign matter by disposing a magnetic piece in the collector or the recess that collects foreign matter.

Thus, by the centrifugal force or flow velocity of refrigerant, foreign matter in the refrigerating cycle can be separated and collected, and clogging of the throttling unit by foreign matter can be prevented. This action can prevent spiral of deposit of foreign matter in the throttling unit, decrease in flow rate of refrigerant, rise of compression ratio of refrigerating cycle, elevation of discharge temperature, and promotion of wear of the compressor. Moreover, reliability of the refrigerating cycle can be enhanced.

(Embodiment 1)

FIG. 1 is a partial longitudinal sectional view of a cooling system in embodiment 1 of the invention. Herein, reference numeral 1 denotes a connection piping, which is provided in a front portion of a throttling unit 2 of a refrigerating cycle. However, the connection piping 1 may be provided also in a rear portion, or in both front portion and rear portion of the throttling unit 2. The connection piping 1 is a coil shaped pipe, and a fine pipe 3 is connected at its lowest position, and a collector 4 is coupled to the fine pipe 3. In this constitution, when refrigerant flows in the connection piping 1, foreign matter such as worn powder is guided into the collector 4 through the fine pipe 3 by centrifugal force. By installing a magnetic piece 5 in the collector 4, separating effect may be further enhanced. By thus collecting the foreign matter such as worn powder, clogging of the throttling unit 2 in the refrigerating cycle can be prevented, and rise of discharge temperature may be also avoided. Moreover yet, if worn powder is contained in refrigerating machine oil, abrasion is further promoted in sliding parts. By removing the worn powder, therefore, progress of wear can be retarded.

(Embodiment 2)

Figure 2:
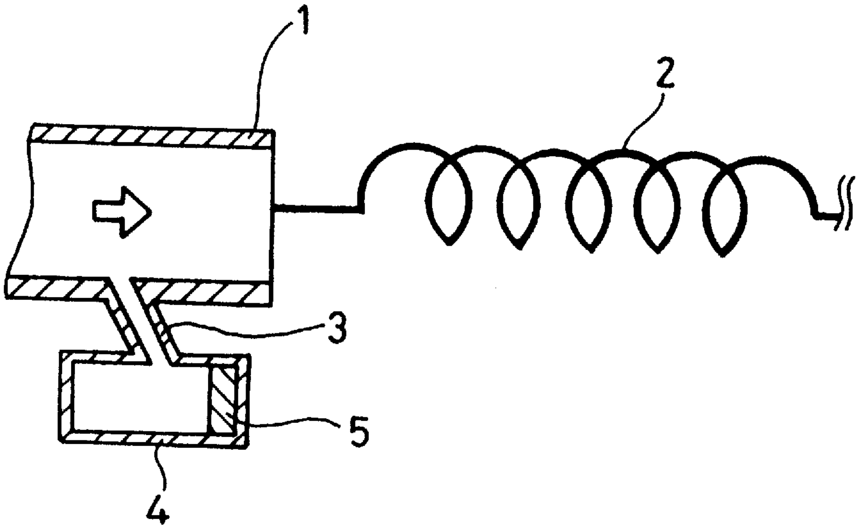
FIG. 2 is an essential longitudinal sectional view of a refrigerating cycle in embodiment 2 of the invention.

Embodiment 2 of the invention is described below. In FIG. 2, reference numeral 1 denotes a connection piping, which is provided in at least front portion or rear portion of a throttling unit 2 of a refrigerating cycle. A fine pipe 3 is connected to a lower portion of the connection piping 1. A center line of the fine pipe 3 is inclined at an angle of 90° or less in a flowing direction of refrigerant. A collector 4 is coupled to a leading end of the fine pipe 3. Accordingly, when the refrigerant flows in the connection piping 1, foreign matter such as worn powder is guided into the collector 4 through the fine pipe 3 by flow velocity of the refrigerant, and is separated. The separating effect may be further enhanced by installing a magnetic piece 5 in the collector 4.

(Embodiment 3)

Figure 3:
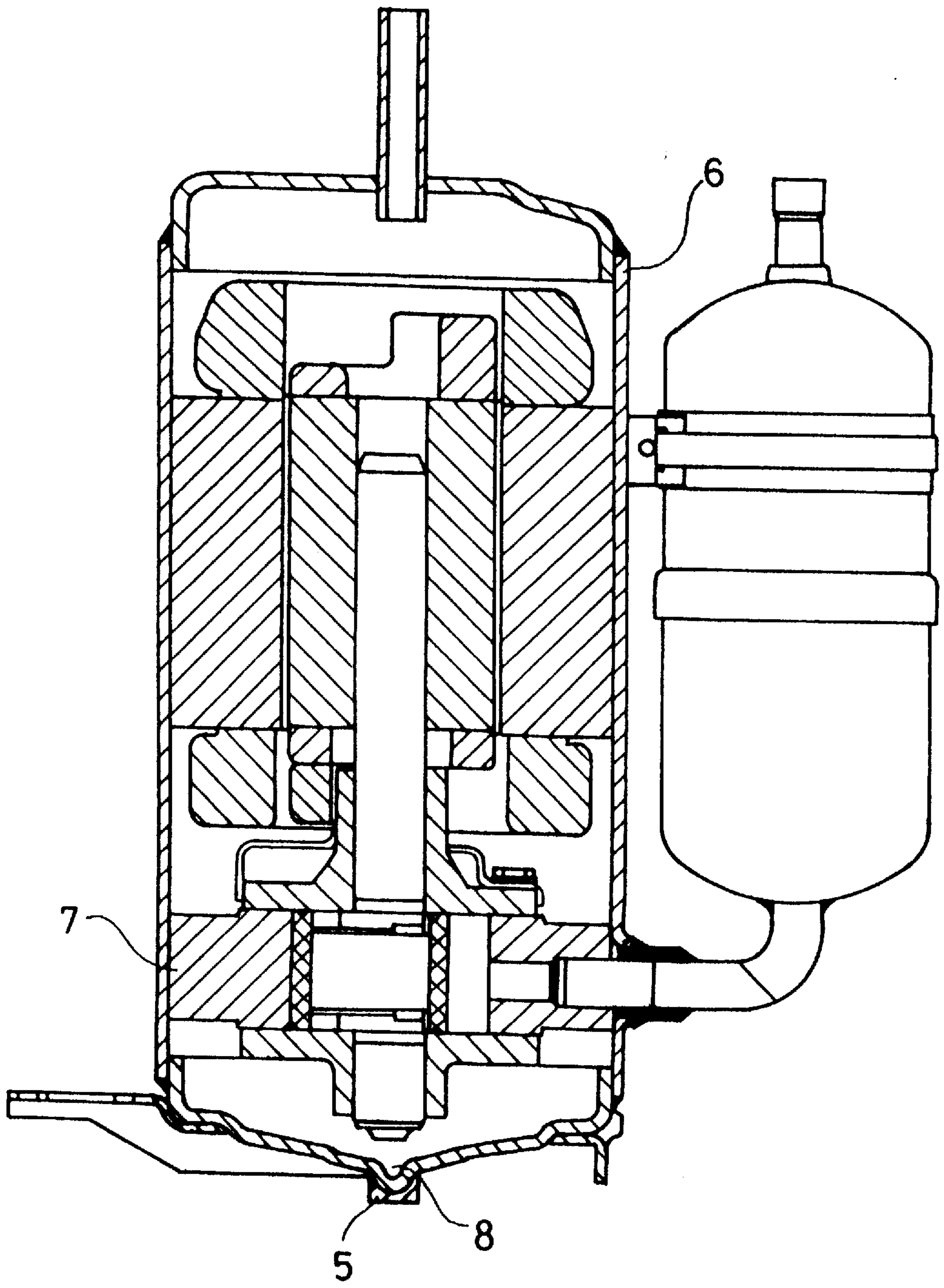
FIG. 3 is a longitudinal sectional view of a compressor in embodiment 3 of the invention.

Embodiment 3 of the invention is described below. In FIG. 3, reference numeral 6 denotes an enclosed container of a compressor, and comprises a compressing mechanism 7. A recess 8 is formed in a lowest position of the enclosed container 6. Therefore, foreign matter such as worn powder is collected in the recess 8 by difference in specific gravity and force generated in a rotating direction at the time of operation of the compressor. The collecting effect may be further enhanced by attaching a magnetic piece 5 to the recess 8.

(Embodiment 4)

Figure 4:
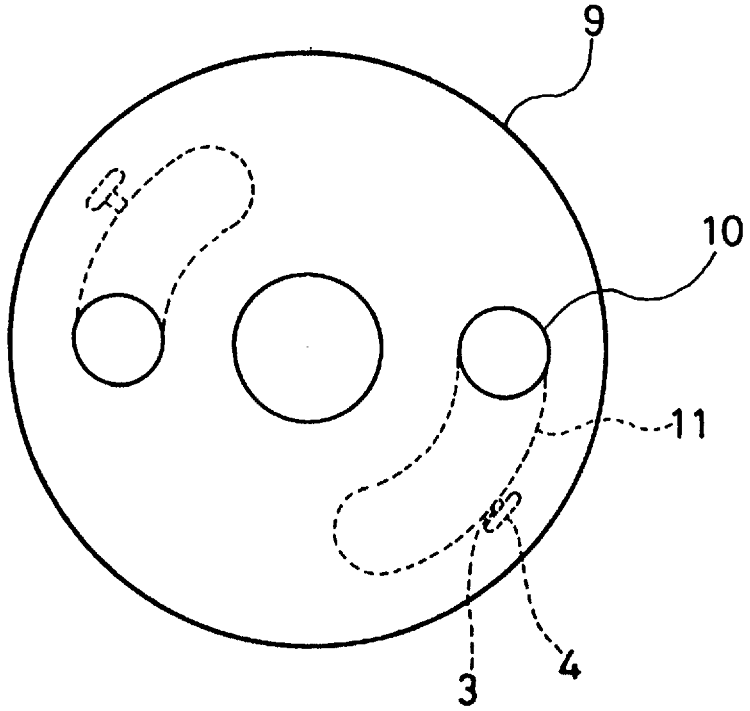
FIG. 4 is a plan view of a muffler in embodiment 4 of the invention.

Embodiment 4 of the invention is described below. FIG. 4 shows a muffler 9 of a compressor. Herein, reference numeral 10 denotes a discharge hole, a communication path 11 curved in an arc form is connected to the discharge hole 10. A fine pipe 3 is provided at an outside of the communication path 11, and a collector 4 is coupled to a leading end of the fine pipe 3. In this constitution, foreign matter such as worn powder is separated from refrigerant by centrifugal force, and is collected in the collector 4 through the fine pipe 3.

(Embodiment 5)

Figure 5:
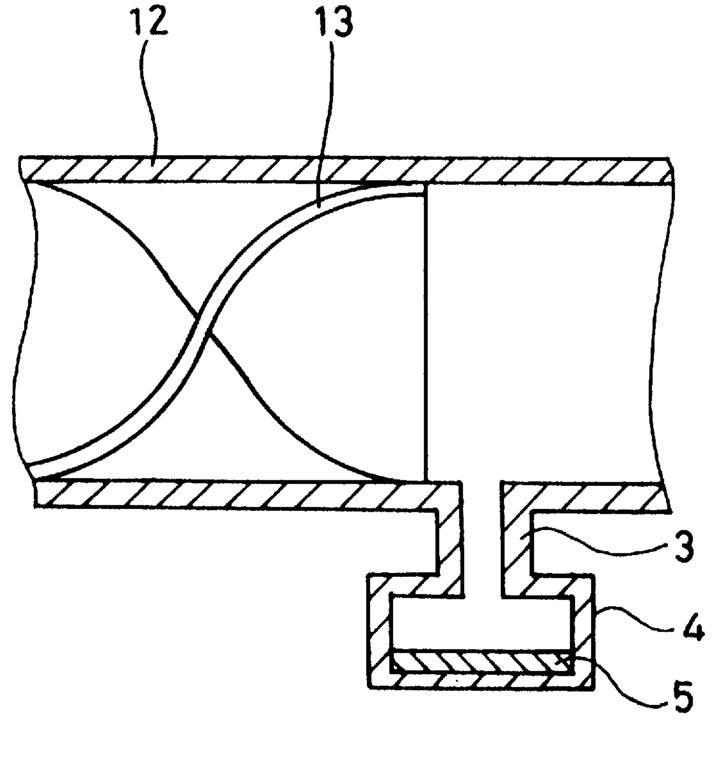
FIG. 5 is an essential longitudinal view in embodiment 5 of the invention.

Embodiment 5 of the invention is described below. In FIG. 5, in a piping 12 for composing a refrigerating cycle, a rotary plate 13 twisted in a spiral direction is provided, a fine pipe 3 is provided at a downstream side thereof, and a collector 4 is coupled to a leading end of this fine pipe 3. In this constitution, when refrigerant passes in the piping 12, a vortex flow is created by the rotary plate 13, and by centrifugal force due to the vortex flow, foreign matter such as worn powder in the refrigerant is collected in the collector 4 through the fine pipe 3, and is separated. Reference numeral 5 denotes a magnetic piece for enhancing the collecting effect.

(Embodiment 6)

Figure 6:
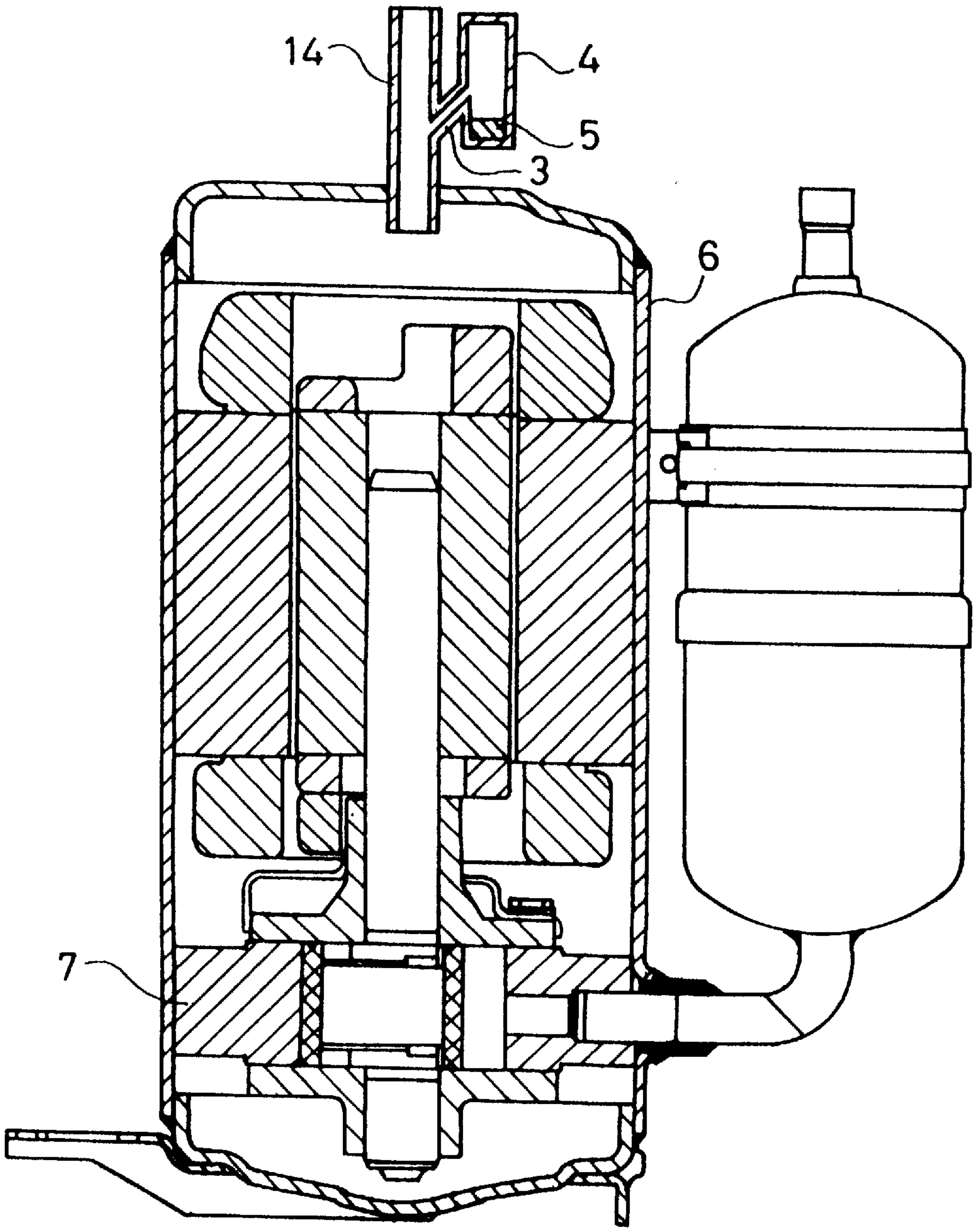
FIG. 6 is a longitudinal sectional view of a compressor in embodiment 6 of the invention.

Embodiment 6 of the invention is described below. In FIG. 6, reference numeral 6 is an enclosed container of a compressor, and comprises a compressing mechanism 7. In an upper portion of the enclosed container, a discharge pipe 14 for discharging compressed refrigerant is connected, and a fine pipe 3 is connected to this discharge pipe 14. A center line of the fine pipe 3 is inclined at an angle of 90° or less in a flowing direction of refrigerant. A collector 4 is coupled to a leading end of the fine pipe 3. Accordingly, by a flow velocity of the refrigerant, foreign matter such as worn powder is guided into the collector 4 through the fine pipe 3. By installing a magnetic piece 5 in the collector 4, the collecting effect may be further enhanced.

(Embodiment 7)

Figure 7:
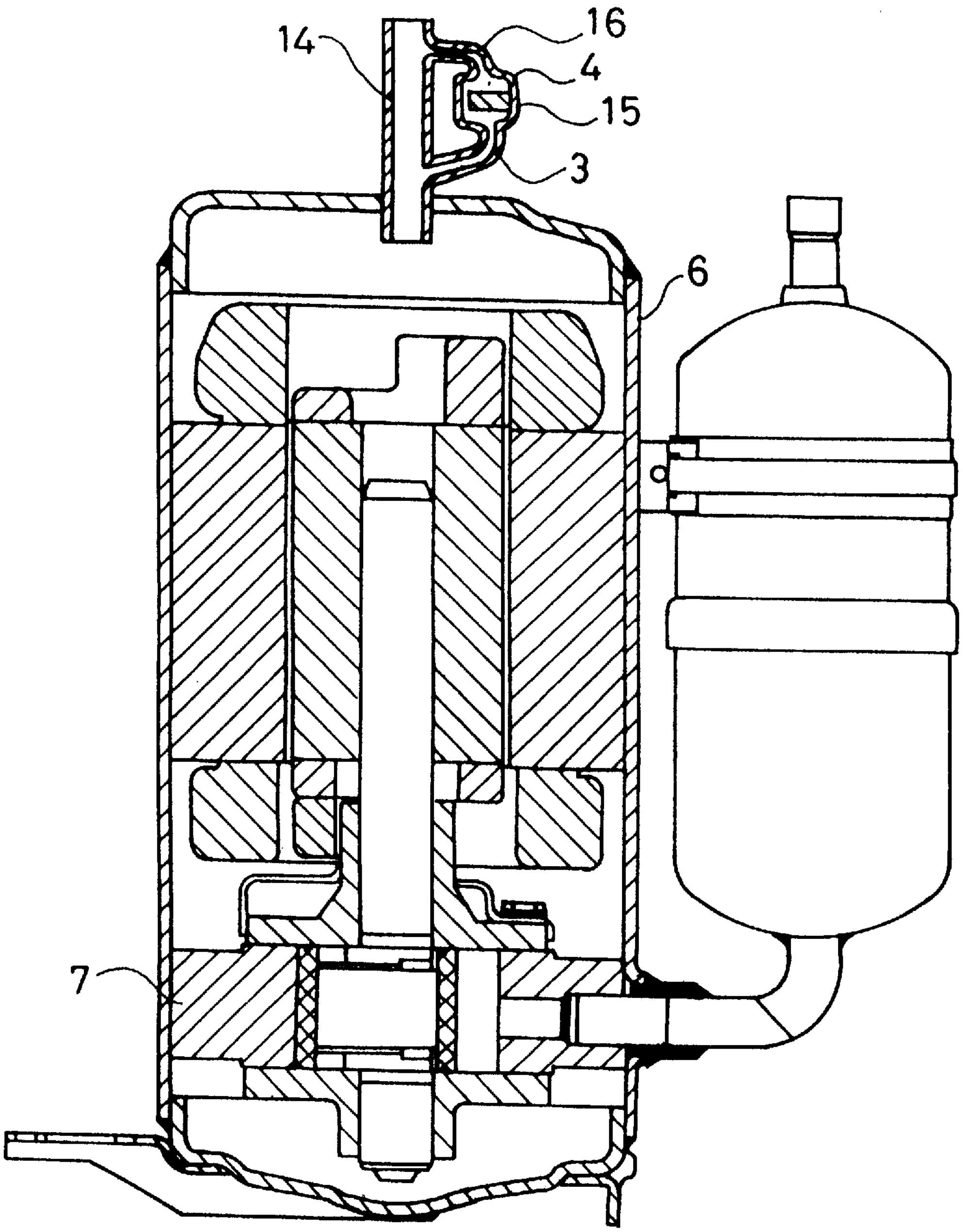
FIG. 7 is a longitudinal sectional view of a compressor in embodiment 7 of the invention.

Embodiment 7 of the invention is described below. In FIG. 7, in an enclosed container 6 of a compressor having a compressing mechanism 7, a discharge pipe 14 for discharging compressed refrigerant is provided. A fine pipe 3 inclined in a flowing direction of refrigerant is connected to the discharge pipe 14, and a collector 4 is coupled to a leading end of the fine pipe 3. The collector 4 comprises a filter 15. At other outlet of the collector 4, a bypass pipe 16 is provided, and the bypass pipe 16 and the discharge pipe 14 are coupled to each other. In this constitution, from the discharged refrigerant, foreign matter such as worn powder is collected by the filter 15.

(Embodiment 8)

Figure 8:
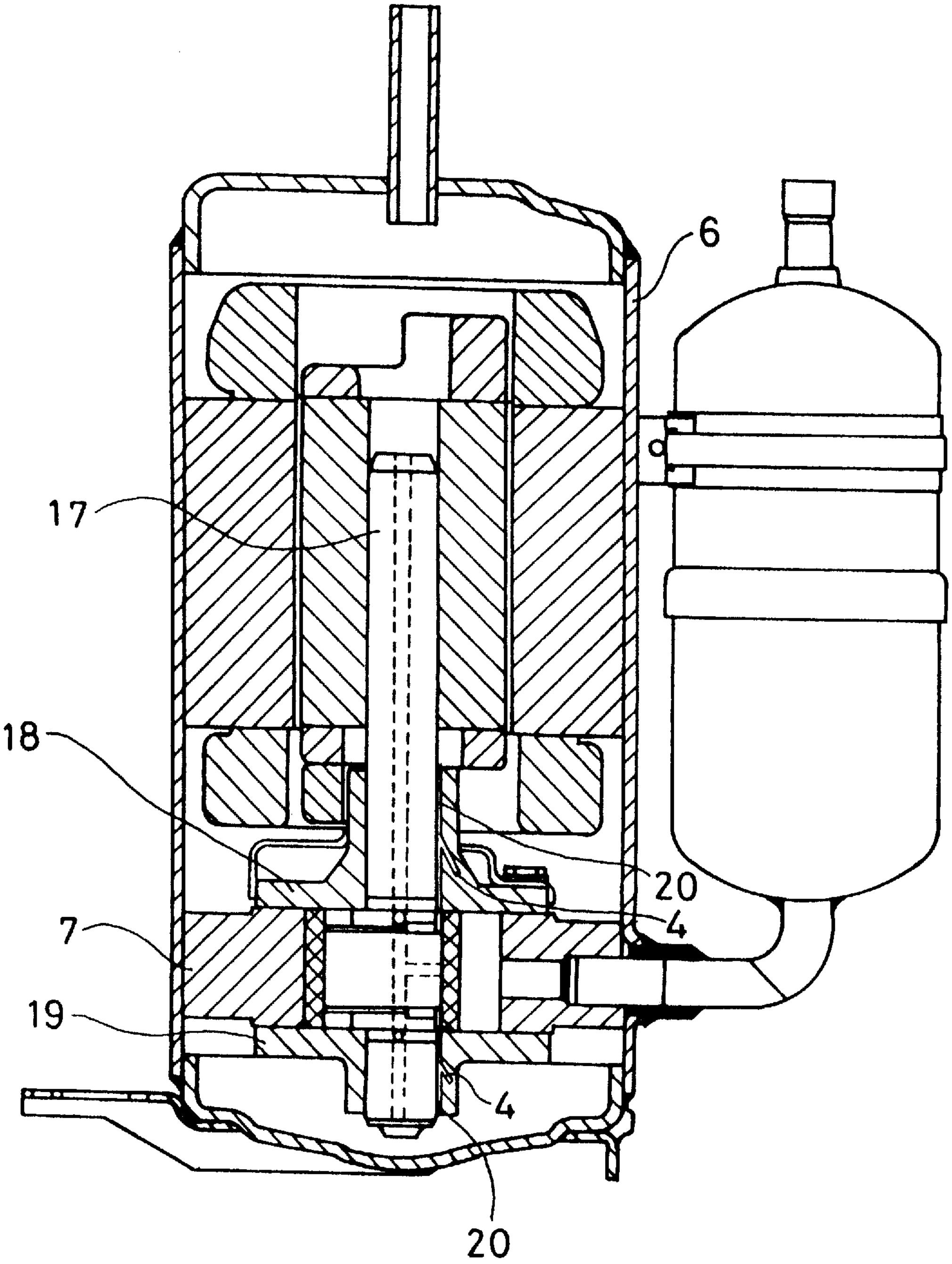
FIG. 8 is a longitudinal sectional view of a compressor in embodiment 8 of the invention.

Embodiment 8 of the invention is described below. In FIG. 8, reference numeral 6 is an enclosed container of a compressor, and comprises a compressing mechanism 7. The compressing mechanism 7 includes a rotary shaft 17 for transmitting rotation, and an upper bearing 18 and a lower bearing 19 for supporting the rotary shaft 17. An oil feed path 20 for lubrication is provided in the upper bearing 18 and the lower bearing 19. In the oil feed path 20, a collector 4 inclined at an angle of 90° or less in a flowing direction of lubricating oil and closed at other end is provided. In this constitution, foreign matter such as worn powder in a refrigerating machine oil is separated due to difference in specific gravity when passing through the oil feed path 20, and is collected in the collector 4.

(Embodiment 9)

Figure 9:
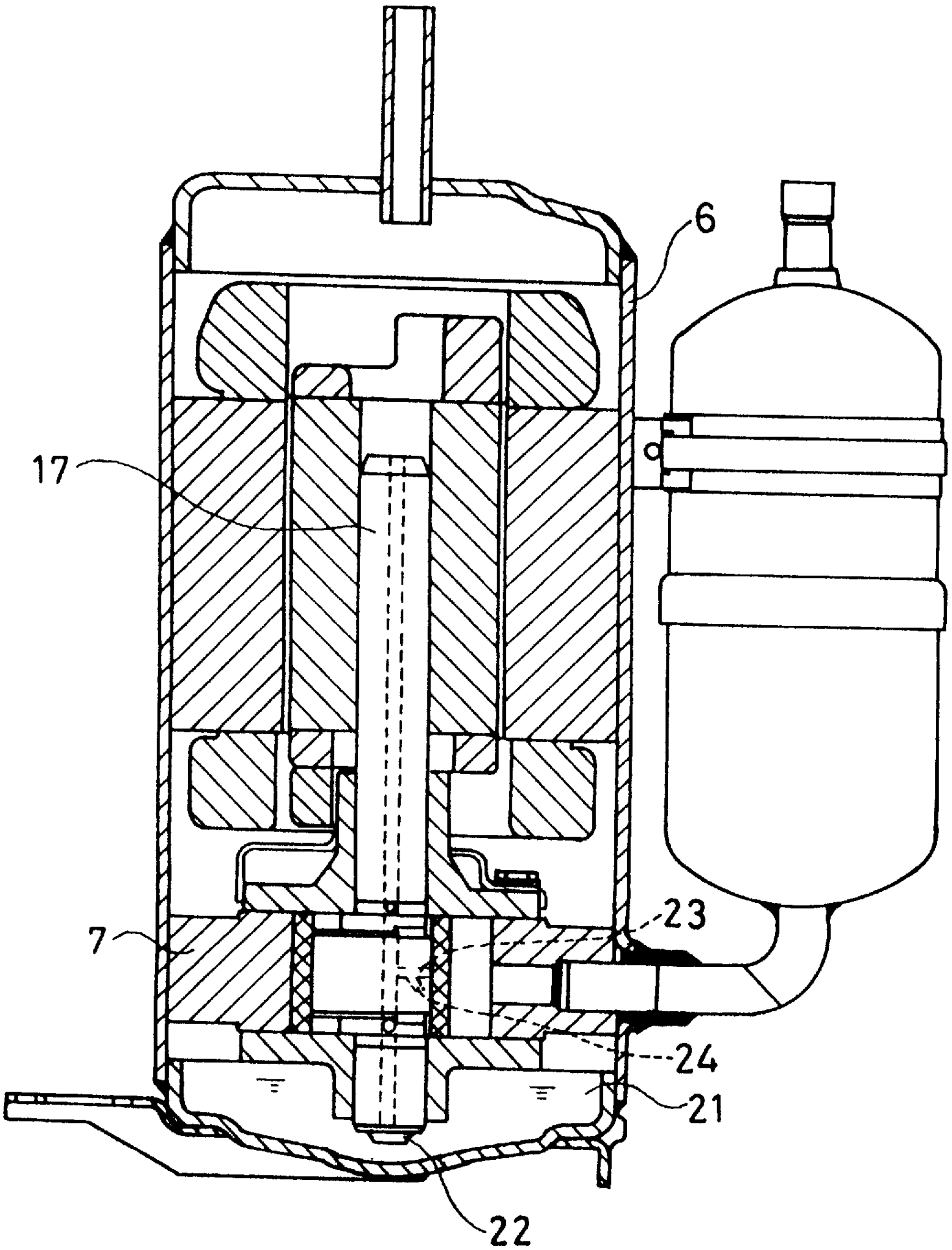
FIG. 9 is a longitudinal sectional view of a compressor in embodiment 9 of the invention.

Embodiment 9 of the invention is described below. The compressor in FIG. 9 has a compressing mechanism 7 provided in an enclosed container 6, and employs chlorine-free hydrofluorocarbon as refrigerant either alone or in mixture. A refrigerating machine oil 21 compatible with the refrigerant is packed in the enclosed container 6. The compressing mechanism 7 has a rotary shaft 17, and an oil feed pump 22 is provided in the rotary shaft 17. In the rotary shaft 17, further, a communication hole 23 is formed to feed the refrigerating machine oil to necessary parts. Beneath the communication hole 23, a passage 24 extending downward is communicating. The other end of the passage 24 is closed. In this constitution, foreign matter such as worn powder in the refrigerating machine oil 21 is separated by difference in specific gravity, and is collected in the passage 24.

(Embodiment 10)

Figure 10:
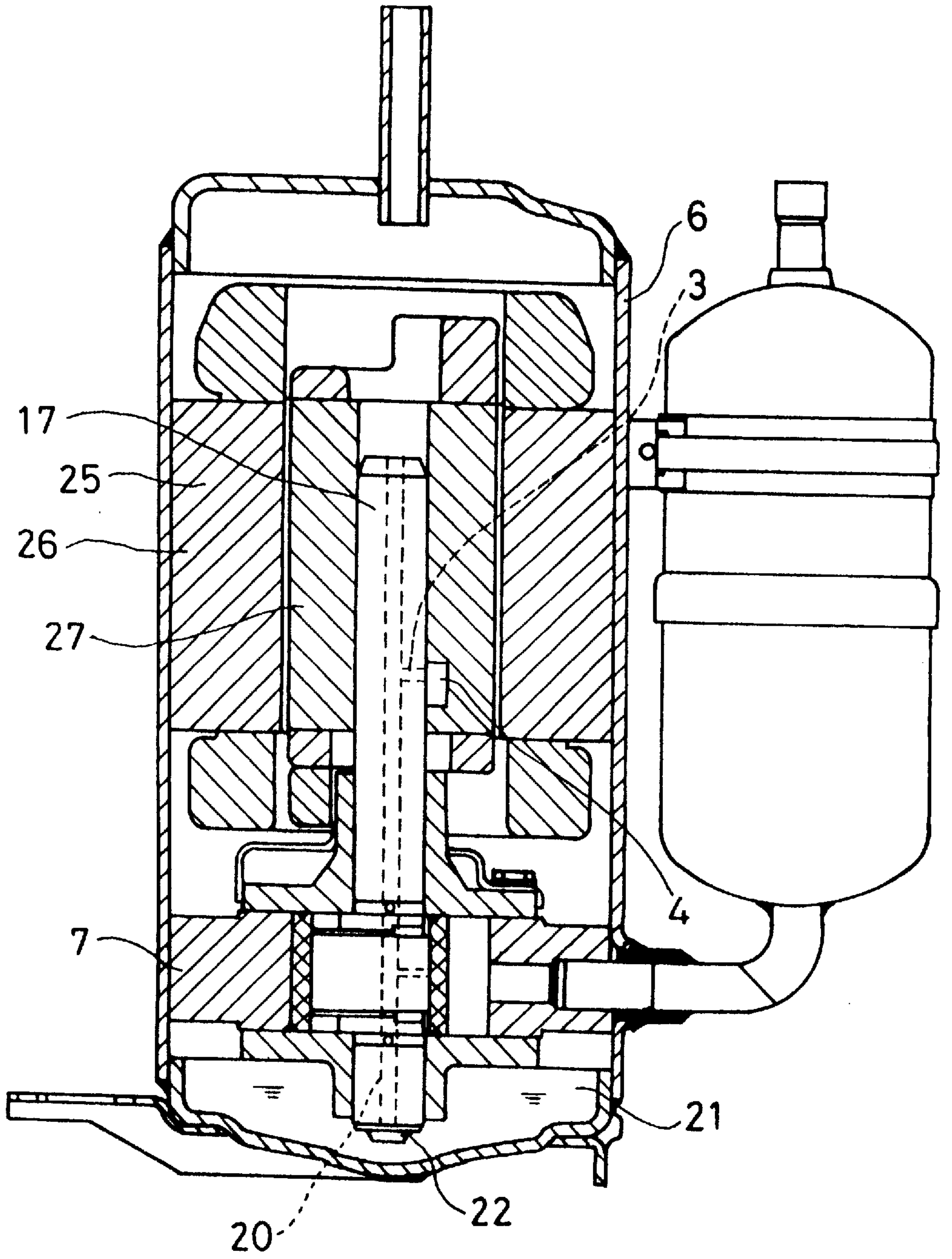
FIG. 10 is a longitudinal sectional view of a compressor in embodiment 10 of the invention.
Figure 11:
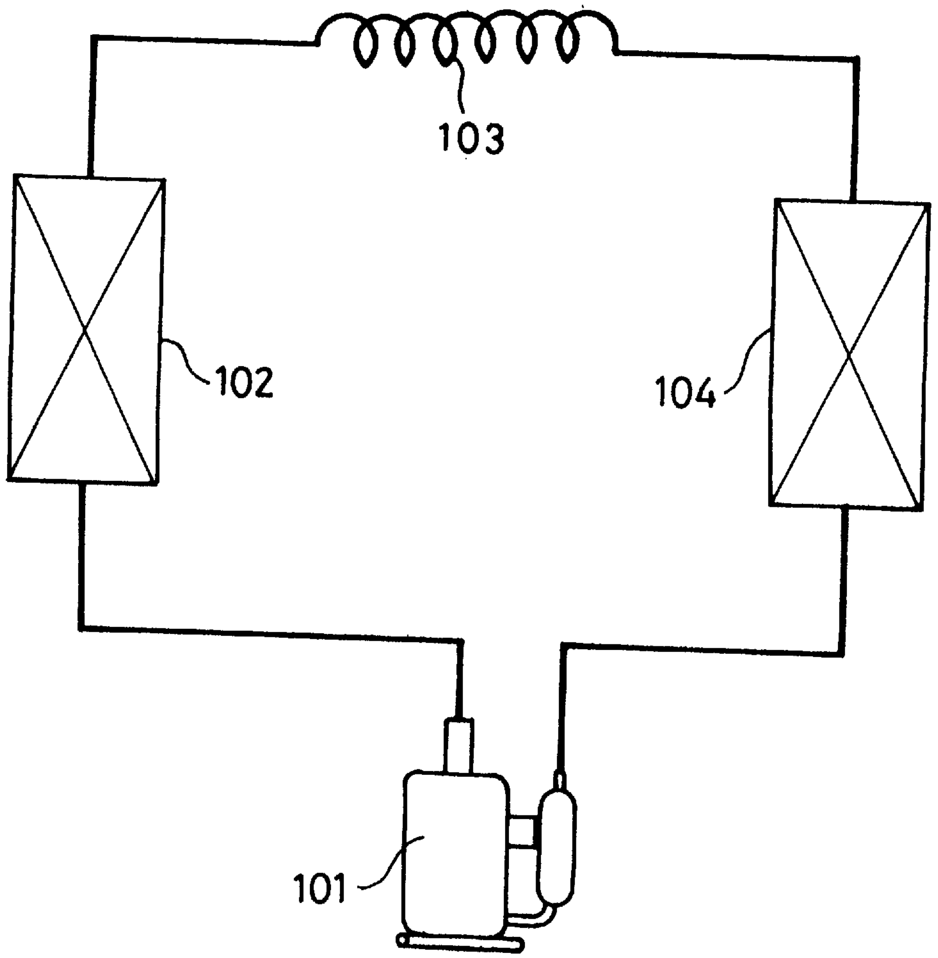
FIG. 11 is an explanatory diagram of a conventional refrigerating cycle.

Embodiment 10 of the invention is described below. The compressor in FIG. 10 has a motor 25 and a compressing mechanism 7 provided in an enclosed container 6, and employs chlorine-free hydrofluorocarbon as refrigerant either alone or in mixture. A refrigerating machine oil 21 compatible with the refrigerant is packed in the enclosed container 6. The motor 25 is composed of a stator 26 and a rotor 27, and the rotor 27 has a rotary shaft 17 for transmitting rotation to the compressing mechanism 7. The rotary shaft 17 has an oil feed pump 22, and the refrigerating machine oil 21 is supplied to sliding parts through an oil feed path 20. A fine pipe 3 is formed in the oil feed path 20, and other open end of the fine pipe 3 is connected to a collector 4 provided in the rotor 27. Accordingly, foreign matter such as worn powder in the refrigerating machine oil 21 is separated due to difference in specific gravity, and is collected in the collector 4.

As described herein, the invention is intended to prevent clogging of the throttling unit by separating foreign matter such as worn powder in the refrigerating cycle or compressor by centrifugal force or difference in specific gravity. As a result, elevation of discharge temperature of compressor is prevented, and spiral of increase of wear is avoided.

Besides, by removing foreign matter such worn powder from the refrigerating machine oil, promotion of wear of sliding parts can be prevented.

Thus, the reliability of the refrigerating cycle and compressor is enhanced, and the service life can be extended.

What is claimed is:

1. A refrigerating cycle comprising a compressor and a throttling unit, said refrigerating cycle further comprising:

a connection pipe connected to at least one of a front end and a rear end of said throttling unit, said connection pipe having a single loop;

a fine pipe connected at one end to a lower portion of the single loop of said connection pipe, said fine pipe being downwardly directed; and a collector to collect foreign matter passing through said connection pipe, said collector being connected to another end of said fine pipe so that the foreign matter does not back flow through said fine pipe and into said connection pipe.

2. The refrigerating cycle of claim 1 wherein a magnetic piece is disposed in said collector.

3. The refrigerating cycle of claim 1, wherein said connection pipe has a equal diameter throughout.

* * * * *

UNITED STATES PATENT AND TRADEMARK OFFICE

CERTIFICATE OF CORRECTION

PATENT NO. : 5,865,607

DATED : February 2, 1999

INVENTOR(S) : Hirotsugu FUKUOKA

It is certified that error appears in the above-indentified patent and that said Letters Patent is hereby corrected as shown below:

On the title page, item [73] Assignee:, change "Electronic" to --Electric--.

Signed and Sealed this

Thirteenth Day of July, 1999

Attest:

Q. TODD DICKINSON

*Attesting Officer*

*Acting Commissioner of Patents and Trademarks*